United States Patent [19]

Fabbri

[11] Patent Number: 4,977,801

[45] Date of Patent: Dec. 18, 1990

[54] MULTIPLE-CHANNEL GUIDING DEVICE FOR BAR-LOADERS OF AUTOMATIC MACHINE TOOLS

[75] Inventor: Vladimiro Fabbri, Faenza, Italy

[73] Assignee: I.E.M.C.A. SpA Industria Elettromeccanica Complessi Automatici, Faenza, Italy

[21] Appl. No.: 358,905

[22] Filed: May 30, 1989

[30] Foreign Application Priority Data

Jun. 3, 1988 [IT] Italy ................................ 3492 A/88

[51] Int. Cl.[5] ............................................. B65H 5/16
[52] U.S. Cl. ....................................... 82/127; 414/18
[58] Field of Search ................ 82/126, 127, 124, 125, 82/162

[56] References Cited

U.S. PATENT DOCUMENTS 2,781,574  3/1957  Hamey et al. ........................ 414/17
3,874,519  4/1975  Mikami ................................ 414/15
4,577,536  3/1986  Lechot et al. ........................ 82/126
4,664,002  5/1987  Cucci et al. ......................... 82/126

Primary Examiner—Frederick R. Schmidt
Assistant Examiner—Keating Johns
Attorney, Agent, or Firm—Guido Modiano; Albert Josif

[57] ABSTRACT

The multiple-channel guiding device for bar-loaders of automatic machine tools comprises an elongated body, peripherally defining a plurality of grooves with different diameters and being rotatable about its own longitudinal axis so as to move one of the grooves to a loading position aligned with the work axis of the machine tool; a plurality of covers co-operating with the grooves so as to define, in their closure position, respective guiding channels for the bar to be machined, the covers being openable to insert the bar; a chute for inserting the bar in the guiding channel arranged in loading position; a bar pusher element slidably actuated inside the channel to advance the bar toward the machine tool.

12 Claims, 3 Drawing Sheets

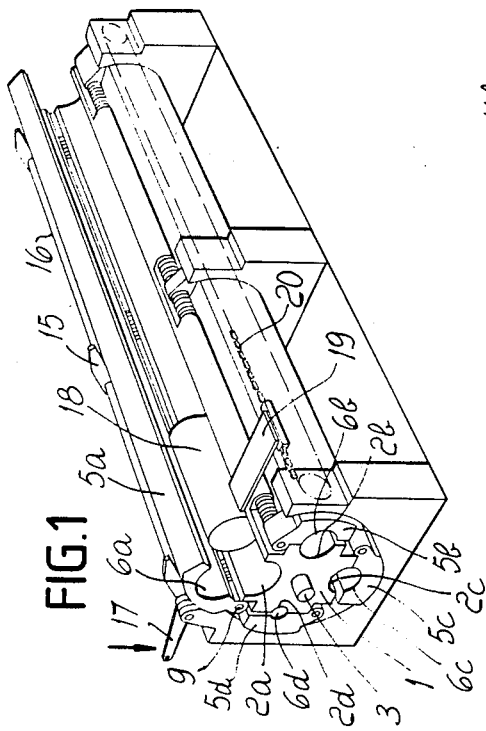
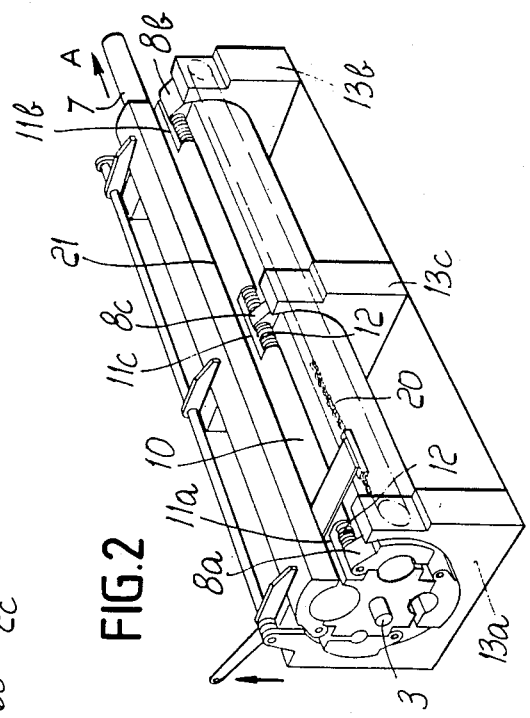
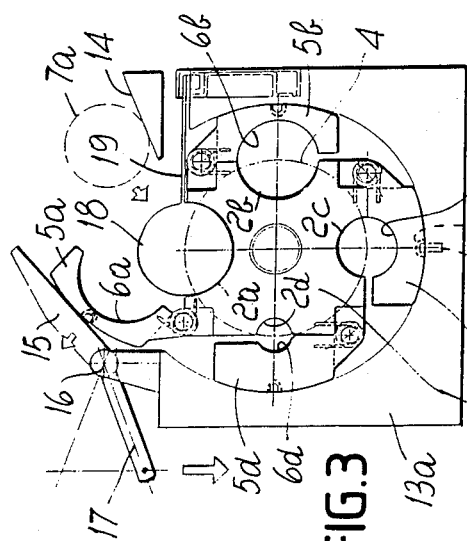
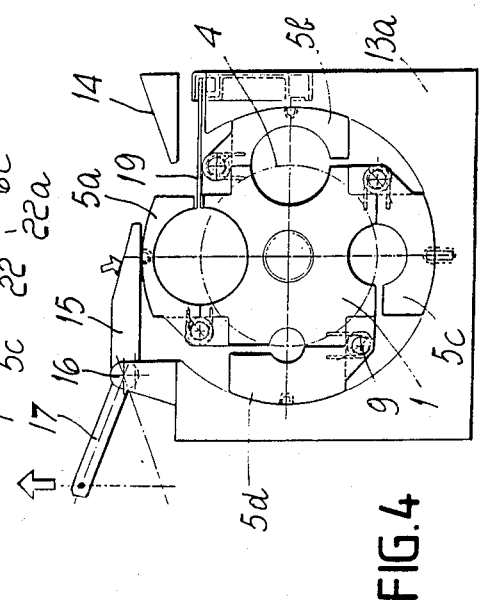

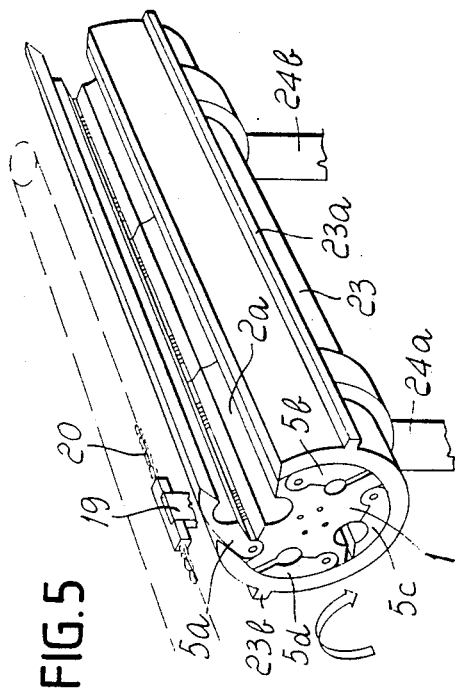
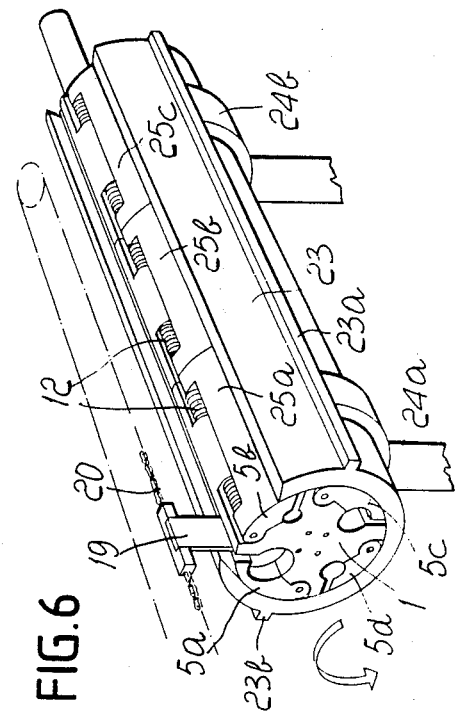
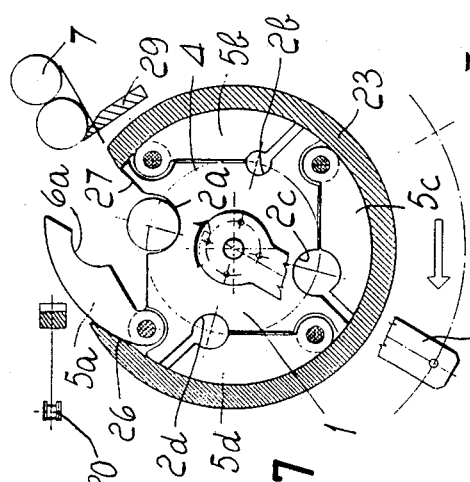
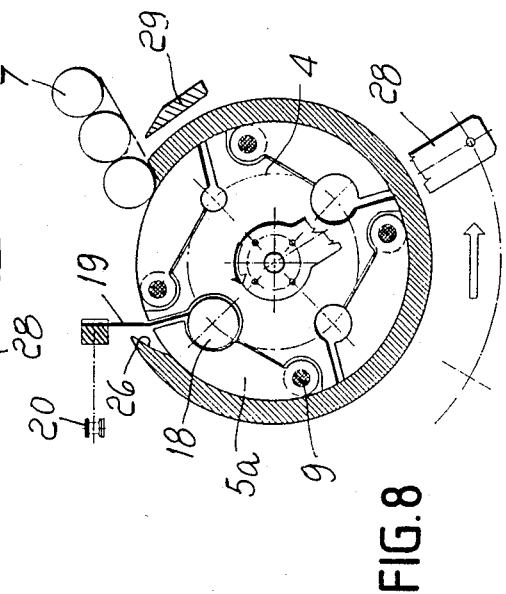

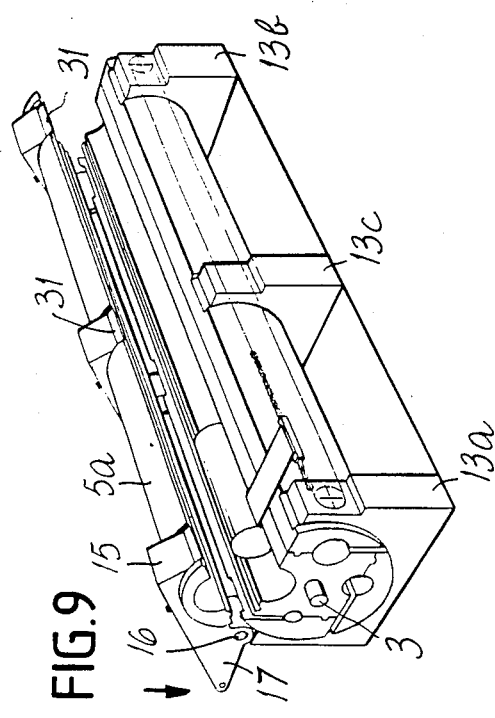
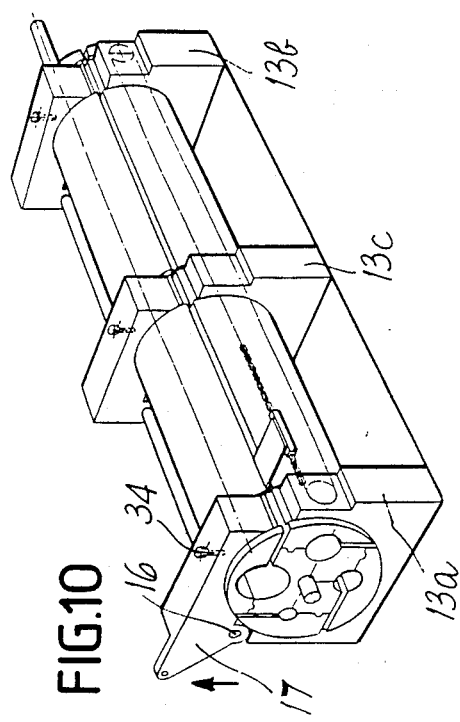
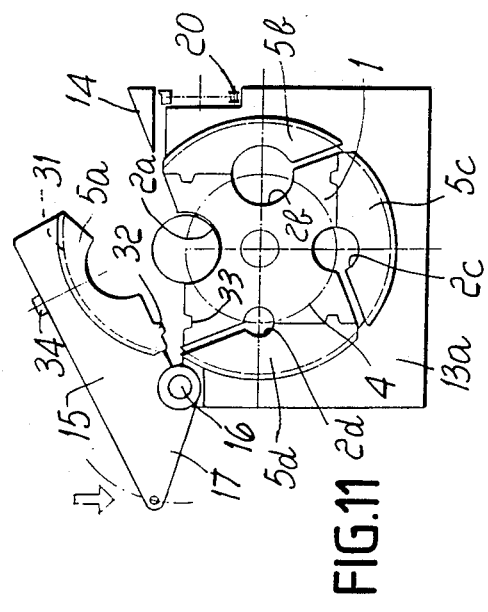
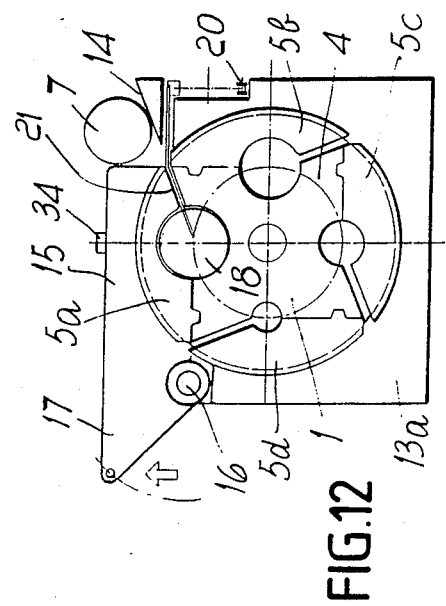

MULTIPLE-CHANNEL GUIDING DEVICE FOR BAR-LOADERS OF AUTOMATIC MACHINE TOOLS

BACKGROUND OF THE INVENTION

The present invention relates to a multiple-channel guiding device for loaders of bars to be machined into automatic machine tools.

As is known, for some kinds of machining automatic lathes are fed with bars of considerable length which must be appropriately guided along their longitudinal axis of advancement. In this case it is generally necessary to load and feed bars of different diameters. This entails the problem of adapting the guiding channel to the dimensions of the bar to be machined, ensuring the exact alignment of said bar with the work axis of the machine tool.

Various devices are currently employed to load bars of different diameters, but they all have significant disadvantages, in particular in relation to their considerable structural and functional complexity, to their large bulk and to the possibility of malfunctions.

SUMMARY OF THE INVENTION

The aim of the present invention is to solve the described problem by providing a device which allows to easily and rapidly load different diameter bars to be machined into automatic machine tools, ensuring their exact alignment with the machine work axis.

Within this aim, an object of the present invention is to provide a loading device which is simple in concept, safely reliable in operation and also has a limited bulk.

According to the invention, this aim and this object are both achieved by the present multiple-channel guiding device, as defined in claim 1.

BRIEF DESCRIPTION OF THE DRAWINGS

The details of the invention will become apparent from the following detailed description, illustrated only by way of non-limitative example in the accompanying drawings, wherein:

FIG. 1 is a perspective view of the loading device according to the invention in its bar insertion position;

FIG. 2 is a corresponding view of said device in its machine tool feeding position;

FIGS. 3 and 4 are transverse sectional views of the device, respectively in its bar insertion position and in its machine tool feeding position; and FIGS. 5–8 and 9–12 are views, corresponding to those of FIGS. 1–4, of two further embodiments of the invention.

DESCRIPTION OF THE PREFERRED EMBODIMENTS

Initially with particular reference to FIGS. 1 to 4, the device has an elongated body 1 defining a plurality of angularly spread grooves 2a, 2b, 2c and 2d which have a semicircular profile and different diameters. Said body 1 is rotatably supported about a longitudinal axis 3; the centers of the grooves 2a, 2b, 2c and 2d are arranged on a circumference which is concentric to said axis 3, as indicated by dash and dot line 4 in FIGS. 3 and 4. More specifically, each of the grooves 2a, 2b, 2c and 2d defines a groove surface which is a portion of a cylindrical surface and which has a longitudinal extension parallel to the body axis 3.

Respective covers 5a, 5b, 5c and 5d, co-operating with the grooves 2a, 2b, 2c and 2d, are longitudinally articulated to the body 1 on one side and extend for the entire length thereof. The covers 5a–5d are internally provided with respective grooves 6a, 6b, 6c and 6d with a semicircular profile which is equal in diameter to that of the corresponding grooves 2a, 2b, 2c and 2d, or, more specifically, each of the cover grooves 6a, 6b, 6c and 6d defines a cover groove surface which, similarly to the groove surfaces of the grooves of the body 1, is a portion of a cylindrical surface and which has a longitudinal extension parallel to the body axis 3. The covers 5a, 5b, 5c and 5d cooperate with the grooves 2a, 2b, 2c and 2d so as to define therewith, in closure position of the covers, respective guiding channels for bars 7 (FIG. 2) which have mutually different diameters and respective axes which are arranged equidistant from said body axis 3. More in detail, each cover 5a–5d is hinged, by means of bushings 8a, 8b and 8c defined at the longitudinal ends and at a middle portion of the covers, on a respective shaft 9 supported by a sleeve 10 defined by the body 1. The bushings 8a–8c are arranged at recesses 11a, 11b and 11c defined at the ends of the sleeve 10 and in its middle region. Each cover is biased by two pairs of springs 12 mounted on the shaft 9 and torsionally acting so as to open said cover.

The outer surface of the covers 5a–5d is cambered according to a circular profile which is coaxial to the axis 3 of the body 1. The assembly formed by the body 1 and by the covers 5a–5d in their closure position therefore defines a sort of cylindrical drum assembly having an outer cylindrical surface and which, at its ends, rests on a pair of supports 13a, 13b and centrally on a support 13c. More than one intermediate support can be provided in the practical implementation. The supports 13a–13c define respective upwardly open circular cavities and, besides constituting a stable coupling for said drum, they keep the covers 5a–5d in the closed position against the body 1, except the upper one, which is intended to close the actual bar loading channel as described in greater detail hereinafter.

A chute 14 is arranged laterally to said loading channel to insert a bar 7 therein.

A closure element acts on the upper cover and comprises a set of three presser arms 15 radially mounted on a shaft 16 which is angularly rotatable by action of a lever 17 controlled by an actuator, for example a jack.

A pusher or bar-pusher 18 is slidably guided inside the relative loading channel to advance the bar 7 toward the machine tool. The pusher 18 is rigidly associated with a slider 19 reciprocatingly actuated by means of a chain element 20. It should be noted that the free longitudinal side of the covers of the channel being loaded cannot rest on the body 1 by virtue of the presence of the slider 19. Therefore this free side remains raised with respect to the body 1 and defines therewith a slot 21 adapted to allow the passage of the slider 19. Each cover is externally provided with a hole 22a for inserting a dowel 22 which allows the device to be locked in its angular loading position.

The operation of the loading device is easily understandable from the preceding description. The body 1 is rotated so as to move the channel with a diameter matching the bar to be machined, to the upper loading position. In this position the cover 5a of the upper channel is initially open, as can be seen in FIGS. 1 and 3. By means of the chute 14 it is therefore possible to insert the bar to be machined into the channel, as indicated at 7a in FIG. 3.

The loading channel is then closed by means of the presser arms 15 acting in contrast with the torsion springs 12, as shown in FIGS. 2 and 4. The subsequent actuation of the pusher 19 advances the bar in the direction indicated by the arrow A.

To summarize, the device according to the invention allows a very simple selection of the appropriate guiding channel for the bar to be machined and insertion of said bar in said guiding channel by opening its cover. The device furthermore has small dimensions.

FIGS. 5-8 illustrate a further embodiment of the device, in which elements functionally similar to those of the device illustrated in FIGS. 1-4 have been indicated by the same reference numerals.

As can be seen, the body 1 and the respective covers 5a-5d are accommodated in a tube 23 which is upwardly open and is supported by supports 24a, 24b allowing relative longitudinal movement of the tube 23, but preventing rotation thereof due to diametrically opposite wings 23a, 23b.

Each cover comprises a plurality of sections 25a, 25b, 25c adapted to open outward by virtue of the springs 12 when said sections are at the upper opening of the tube 23. In the position for receiving the bars 7 in the respective groove 2a-2d, the covers abut against an edge 26 of the upper opening of the tube 23. In this position, each groove 2a-2d is connected to a bar release device (not shown) by an inclined plane 27 which simultaneously, together with a corresponding edge of the cover 5a-5d, delimits the opening for the passage of the bar-pusher slider 18, which is conveniently downwardly directed, when the body 1 is rotated to the bar advancement position.

The operation of the described device is as follows. With the bar-pusher moved backward, the body 1 is rotated clockwise until it reaches the angular position of FIG. 7, at which the cover 5a remains open against the edge 26 and the inclined plane 27 is flush with the opposite edge. The body 1 rotates by means of a lever 28 which is radially associated with one end thereof and is subject to an actuation.

By actuating the selector 29, a bar 7 is separated from the others and is conveyed into the groove 2a. Then the cover 5a is forced to close on the body 1 by reversing the direction of rotation of the lever 28. The angle of rotation of the body 1 is set so that the bar-pusher can enter the channel 2a accommodating the fed bar.

The embodiment of FIGS. 9-12 is different in that the covers are not pivoted to the body 1 but the cover of the channel with appropriate diameter is fixed to the arms 15.

To this end, the covers 5a-5d are peripherally provided with cross grooves 31 which are concentric to the circle 4; the inner edges of the supports 13a-13c and of the arms 15 engage in said grooves and axially retain said covers.

In order to ensure exact positioning of the covers to the body 1 in the closure positions of the channels, each cover has a longitudinal ridge 32 adapted to fit in a respective grooves 33 of the body 1 adjacent to the groove 2a-2d.

The covers are opened and closed by coupling the upper cover to the arms 15 by means of bolts 34. In all other respects, the operation of the device is fully identical to that of the example of FIGS. 1-4.

In the practical embodiment of the invention, the materials employed, as well as the shapes and dimensions, may be any according to the requirements.

I claim:

1. A multiple-channel guiding device for bar loaders of automatic machine tools comprising:

an elongated body having a longitudinal axis and a plurality of grooves being peripherally defined thereon, each groove of said plurality of grooves having a substantially semicircular profile, said elongated body being rotatable about said longitudinal axis so as to selectively move said grooves to a loading position, a plurality of covers cooperating with said grooves and being positionable between an opened position and a closure position, a plurality of substantially circular bar guiding channels being defined by said cooperating covers and grooves when said covers are in said closure position, said plurality of channels having mutually different diameters and having centers arranged on a circle which is concentric to said axis, means for inserting bars in said grooves, said covers being positioned in said opened position when said grooves are in said loading position to thereby receive bars, a bar-pusher element being slidably actuated inside said channels to advance bars therein, a cylindrical drum assembly being defined by said body and said covers when said covers are in said closure position, said covers having outer surfaces being cambered so that said cylindrical drum defines an outer surface having a substantially circular profile being concentric to said axis, said device further comprising at least one substantially upwardly open support means for rotatingly supporting said cylindrical drum, said support means defining at least one substantially circular cavity and an opening, said cylindrical drum being rotatably accommodated in said circular cavity of said support means, said upwardly opening support means allowing said covers to be positioned in said opened position at said opening thereof.

2. A device according to claim 1, wherein each cover of said covers is longitudinally pivoted to a respective one of said grooves, said each cover defining a substantially semicircular cavity having a cavity radius equal to that of a groove radius of said respective one of said grooves, said covers and said grooves defining therewith said guiding channels having mutually different diameters when said covers are in said closure position, said channels having slots for passage of said bar-pusher element therethrough.

3. A device according to claim 1, wherein each cover of said covers is longitudinally pivoted to said body, spring means being provided and acting on said each cover to thereby bias said each cover towards said opened position, said each cover being biased towards said opened position by said spring means when a correspondingly one of said grooves with which said each cover mutually defines one of said bar channels is in said loading position.

4. A device according to claim 1, further comprising at least one arm radially mounted on a rotatable shaft, said shaft having an extension parallel to said longitudinal axis of said body and being rotatably controlled by an actuator, said arm acting on one of said covers to close said one cover when said one cover is arranged at said opening of said support means.

5. A device according to claim 1, wherein said support means comprises a tubular member having a substantially upper opening, said upper opening defining an abutment edge which abuts and closes said covers as said covers rotatably pass therealong when said cylindrical drum is rotated.

6. A device according to claim 4, wherein said covers and said body mutually define male-female connection elements which correctly align said covers with said body when said covers are in said closure position, said covers being connectably associable to said arm by means of screw means.

7. A device according to claim 5, wherein said support means further comprises upwardly open support members, said tubular member having diametrically opposite protruding longitudinal wings, said support members accommodating said tubular member and supporting said tubular member such that said tubular member is longitudinally movable with respect to said support members, said longitudinal wings of said tubular member abutting with upper ends of said support members to make said tubular member non-rotatable with respect to said support members.

8. A multiple-channel cylindrical bar guiding and feeding device comprising:

an elongated body having a longitudinal axis and a plurality of peripherally defined grooves, each groove of said plurality of grooves defining a groove surface having a longitudinal extension parallel to said axis and being a portion of a cylindrical surface, said elongated body being rotatable about said longitudinal axis so as to selectively move said grooves to a bar-loading position, a plurality of covers cooperating with said grooves and being positionable with respect to said grooves between an opened position and a closure position, each of said covers defining an inner cover surface having a longitudinal extension perpendicular to said axis and being a portion of a cylindrical surface, a plurality of substantially cylindrical bar guiding channels being defined by said plurality of covers and said plurality of grooves when said covers are in said closure position, said channels having at least mutually different diameters and having axes arranged equidistant from said body axis, means for inserting bars in said grooves when said grooves are in said loading position, said covers being positioned in said opened position when said grooves are in said loading position to thereby receive bars, a bar-pusher means being slidably actuated inside said channels to advance bars therein, a cylindrical drum assembly being defined by said body and said covers when said covers are in said closure position, said covers having outer surfaces being cambered so that said cylindrical drum defines an outer surface being at least a portion of a cylindrical surface which is concentric to said axis, said device further comprising at least one support means for rotatably supporting said cylindrical drum, said support means having an opening and defining at least one support cavity being at least a portion of a substantially cylindrical surface, said cylindrical drum being rotatably accommodated in said support cavity of said support means, said support means allowing said covers to be positioned in said opened position at said opening thereof.

9. A device according to claim 8, wherein each cover of said covers is longitudinally pivoted to said longitudinal body in correspondence with a respective groove of said grooves, a respective one of said channels being defined by said each cover and said respective groove when said each cover is in said closure position, spring means being provided and acting on said each cover to continuously bias said each cover towards said opened position, said support cavity of said support means providing a counter biasing force acting against said spring means to bias said covers towards said closure position, said each cover being arranged in said opened position by said spring means when said each cover is arranged at said opening of said support means.

10. A device according to claim 8, wherein each cover of said covers is longitudinally pivoted to said longitudinal body in correspondence with a respective groove of said grooves, a respective one of said channels being defined by said each cover and said respective groove when said each cover is in said closure position, spring means being provided and acting on said each cover to continuously bias said each cover towards said opened position, said support cavity of said support means providing a counter biasing force acting against said spring means to bias said covers towards said closure position, said each cover being arranged in said opened position by said spring means when said each cover is arranged at said opening of said support means, said support means comprising upwardly open supports defining said at least one support cavity, said device further comprising a closure element means selectively acting upon said each cover when said each cover is arranged at said opening of said support means to position said each cover in said closure position, said closure element means comprising at least one arm radially mounted on a rotatable shaft, said shaft having an extension parallel to said longitudinal axis of said body and being rotatably controlled by an actuator, said arm acting on said each cover to close said each cover when said each is arranged at said opening of said support means, said each cover being provided with a hole means in which is insertible a locking dowel means to lock said each cover in said closure position, each said respective one of said channels having a longitudinal slot being defined between said each cover and said longitudinal body, said bar-pusher means comprising a cylindrical pusher element being arranged in said one of said channels and a slider element being rigidly associated with said pusher element, said longitudinal slot allowing for a passage of said pusher element of said bar-pusher means therethrough, said pusher element being reciprocatingly longitudinally actuated by means of a driven chain element being rigidly associated thereto.

11. A device according to claim 8, wherein each cover of said covers is longitudinally pivoted to said longitudinal body in correspondence with a respective groove of said grooves, a respective one of said channels being defined by said each cover and said respective groove when said each cover is in said closure position, spring means being provided and acting on said each cover to continuously bias said each cover towards said opened position, said support cavity of said support means providing a counter biasing force acting against said spring means to bias said covers towards said closure position, said each cover being arranged in said opened position by said spring means when said each cover is arranged at said opening of said support means, said support means comprising a tubular member having a substantially upper opening and defining therein said support cavity, said upper opening defining an abutment edge which abuts and closes said covers as said covers rotatably pass therealong when said cylindrical drum is rotated, said support means further comprising upwardly open support members, said tubular member having diametrically opposite protruding longitudinal wings, said support members accommodating said tubular member and supporting said tubular member such that said tubular member is longitudinally movable with respect to said support members, said longitudinal wings of said tubular member abutting with upper ends of said support members to make said tubular member non-rotatable with respect to said support members, each said respective one of said channels having a longitudinal slot being defined between said each cover and said longitudinal body, said bar-pusher means comprising a cylindrical pusher element being arranged in said one of said channels and a slider element being rigidly associated with said pusher element, said longitudinal slot allowing for a passage of said pusher element of said bar-pusher means therethrough, said pusher element being reciprocatingly longitudinally actuated by means of a driven chain element being rigidly associated thereto.

12. A device according to claim 8, wherein each cover of said covers and said body mutually define male-female connection elements which correctly align said covers with said body when said covers are in said closure position, a respective one of said channels being defined by said each cover and said respective groove when said each cover is in said closure position, said device further comprising at least one arm radially mounted on a rotatable shaft, said shaft having an extension parallel to said longitudinal axis of said body and being rotatably controlled by an actuator, said each cover having at least one cross groove for accommodating therein said at least one arm, said each cover being connectably associable to said at least one arm by means of screw means when said each cover is arranged at said opening of said support means, each said respective one of said channels having a longitudinal slot being defined between said each cover and said longitudinal body, said bar-pusher means comprising a cylindrical pusher element being arranged in said one of said channels and a slider element being rigidly associated with said pusher element, said longitudinal slot allowing for a passage of said pusher element of said bar-pusher means therethrough, said pusher element being reciprocatingly longitudinally actuated by means of a driven chain element being rigidly associated thereto.

* * * * *